[19] United States Patent
Spoor

[11] 4,267,724
[45] May 19, 1981

[54] STRAIN-GAGE TRANSDUCER BRIDGE GAGES WITH INTEGRAL CALIBRATION RESISTORS

[75] Inventor: Martin Spoor, Cambridge, Mass.
[73] Assignee: Bofors America, Inc., Edison, N.J.
[21] Appl. No.: 1,607
[22] Filed: Jan. 8, 1979
[51] Int. Cl.³ ............................................. G01L 1/20
[52] U.S. Cl. ............................................. 73/862.65
[58] Field of Search ................ 73/141 A, 766, 765, 73/708, 720, 726, 721, 727

[56] References Cited
U.S. PATENT DOCUMENTS
3,826,131  7/1974  Pritschow ........................... 73/766

Primary Examiner—Anthony V. Ciarlante
Attorney, Agent, or Firm—James E. Mrose

[57] ABSTRACT

Each of two pairs of electrical-resistance strain gages which are to make up a measurement bridge for a beam-type load cell is fashioned as a composite wherein two spaced-apart grids of foil-type parallel elongated filaments oriented and functioning as strain gages are made of material promoting a strain gage factor effective to compensate for elastic modulus change of the beam material as temperature varies over an expected range. Intermediate the two grids of strain-gage filaments, where a neutral position between tension and compression surface strains of the sensing element of a gaged beam may be expected to appear, the common insulating backing for the two grids carries a set of narrow strands which produce a dummy foil resistance of predetermined value needed for a calibration wherein it simulates the influence upon bridge input impedance of a temperature-compensation resistance such as would otherwise be used without the inherent compensation for elastic modulus changes by way of offsetting effects of strain gage factor of the gages. The same material which forms the foil or printed-circuit type gage grids also forms the dummy or calibration resistor upon the same underlying backing, and, in addition creates relatively large-area and low-resistance integral interconnections between 8 Claims, 6 Drawing Figures

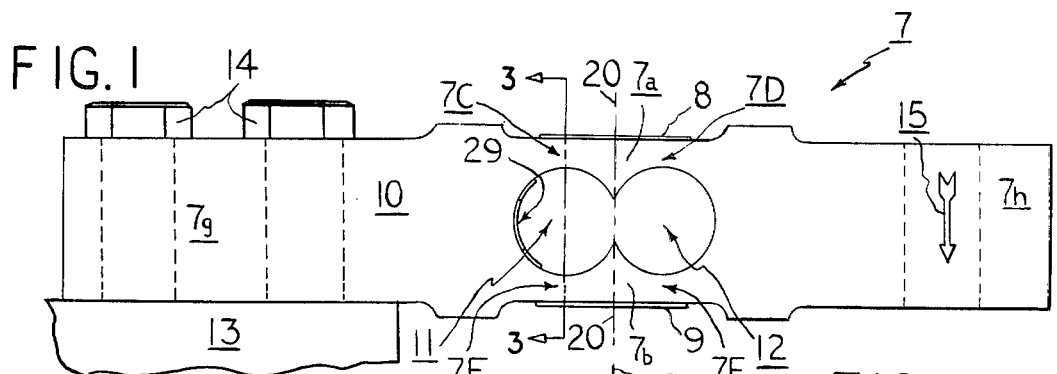
FIG. 1
FIG. 2
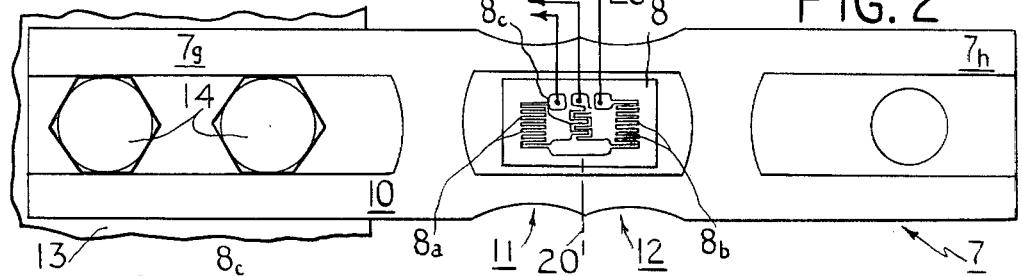
FIG. 3
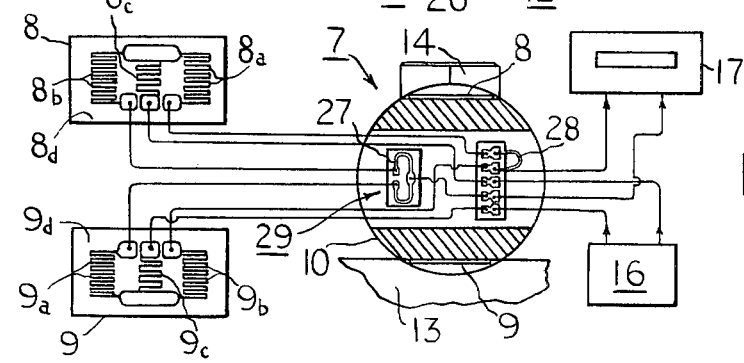
FIG. 5
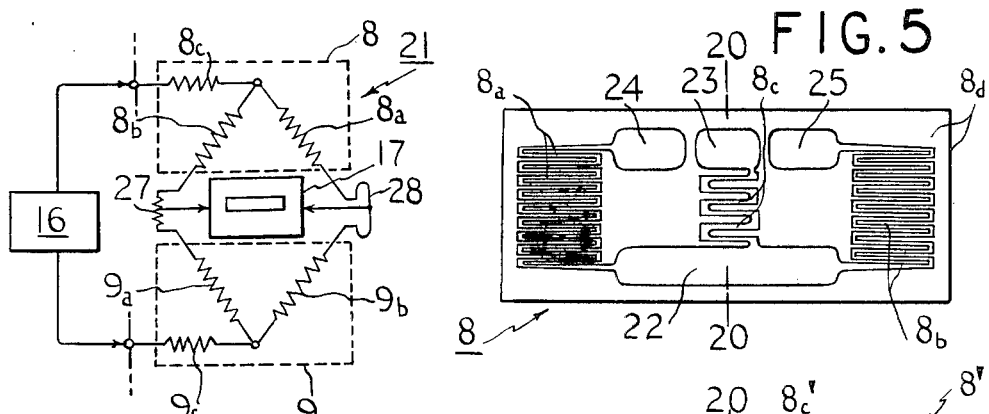
FIG. 4
FIG. 6
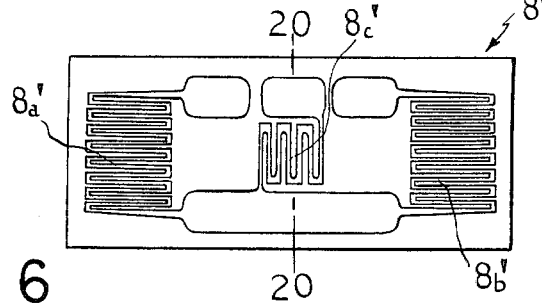

STRAIN-GAGE TRANSDUCER BRIDGE GAGES WITH INTEGRAL CALIBRATION RESISTORS

BACKGROUND OF THE INVENTION

The present invention relates to improvements in the gaging of strain-gage transducers which will exhibit predetermined input-impedance characteristics although gaged so as to be lacking certain customary auxiliary temperature-responsive resistors, and, in one particular aspect, to unique and useful integral combinations of printed-circuit type strain gages and unstrained resistances and low-resistance connections in which the strain gages inherently offset errors induced by temperature dependency of the elastic modulus of transducer materials and in which the unstrained resistances will develop a desired normal input impedance for a transducer bridge network.

Mechanical-to-electrical transducers, in which strain gages respond to elastic deformations of elements experiencing loading, have long been known in a variety of sizes and forms, for purposes of characterizing such phenomena as force, torque, weight and pressure. In common modern constructions, they include a plurality of strain gages, such as four, which are intended to be coupled together as the impedance arms of a full electrical bridge, and which are also associated with special temperature-sensitive resistors serving to introduce compensation for unwanted temperature effects upon the transducer output. As a consequence of customer acceptance and standardizing and convenience of usage in the trade, many electrical-resistance strain gages are made with certain intrinsic values of resistance, and the related input and output impedances of bridges of which they are part, along with compensation and trimming impedances, can usually be relied upon to fall within certain limits and to match with other networks and/or devices.

In accordance with certain improvements which enable strain gages themselves to be used to offset tendencies for a transducer output to vary with temperature, the usual compensation resistors are then not needed in the inputs of bridge networks incorporating such gages, and there can be troublesome mismatching of inputs and related disturbances, particularly where bridge inputs are paralleled and not all exhibit like impedances. Additional installation and wiring of resistances to achieve remedial adjustment of input impedances involves costs and complications which are highly undesirable. However, the present invention resolves such difficulties conveniently and economically by way of printed-circuit or foil-type composite interconnected gage-and-calibration resistance units, the gages affording compensation for changes in modulus of elasticity of transducer material and the resistances calibrating the input of an intended bridge network.

A mechanical combination of a wire gage and like super-positioned and unstrained element serving strictly temperature-compensation purposes appeared rather early in the art, as shown in U.S. Pat. No. 2,344,642, and in U.S. Pat. Nos. 2,350,972 and 2,390,038 and 2,672,048 temperature-compensating filaments were introduced into composite assemblies with wire gage filaments.

SUMMARY OF THE INVENTION

In a preferred expression of the present invention, two electrical-resistance type strain-gage grids are fashioned in spaced-apart relationship atop a single insulating carrier or backing, via appropriate etching of a common metallic-foil layer in accordance with known practices. The two gage grids exhibit parallel filaments crowded together at spaced sites corresponding to those separated positions along the surface of a transducer sensing element where tension and compression strains will evidence themselves simultaneously as the transducer undergoes loading. The foil of which the gages are composed is of nickel-chrome-aluminum alloy treated to yield gages showing strain gage factor changes, with temperature, which offset the changes, with temperature, in elastic modulus of the metal of which the transducer sensing element is formed. One end of each gage is integral with an enlarged low-resistance terminal area, of the same foil, by way of which the gages may be conveniently connected into a measurement-bridge network, and the other gage ends are electrically interconnected by a broad-area low-resistance band of the foil. At a location intermediate the longitudinally-spaced gages, and corresponding to a locus along the surface of an associated transducer sensing element where substantially no surface strain is to be witnessed, the foil is shaped into a further grid pattern, but as a simple resistor rather than as a strain gage; the latter, an input calibration resistor, is electrically and physically merged integrally with the broad-area band at one of its ends and is shaped into a broad-area terminal at the other. When the composite unit is bonded to a transducer element and the two gages are connected into a transducer bridge network as adjacent arms thereof, input must be delivered through the calibration resistor; that resistor increases the input impedance as seen by a source and/or by paralleled networks so that the input impedance is not significantly altered due to elimination of the usual temperature-compensating resistance supplied at the input.

Accordingly, it is one of the objects of this invention to promote unique and advantageous matching of impedances of transducer bridge networks which include strain gages inherently compensating for transducer elastic modulus changes with temperature, by way of integral foil-type composite strain-gage and unstrained calibration-resistance units.

A further object is to provide novel and improved composite integral strain-gage and calibration-resistance foil units which may be readily mounted and connected in measurement networks for transducers.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 provides a side elevational view of a beam-type transducer equipped with integral strain gages and calibration resistances in accordance with the present invention;

FIG. 2 portrays the FIG. 1 transducer from the top;

FIG. 3 includes a section taken along lines 3—3 in FIG. 1, in association with a pictorial diagram involving the two sets of gages and calibration resistances and the input, output and intermediate electrical provisions for the transducer;

FIG. 4 is a partly schematic and partly block-diagrammed electrical network including integral gages and resistances as depicted in FIG. 3;

FIG. 5 represents an integral dual-gage and calibration-resistance unit wherein the invention may be expressed; and FIG. 6 represents a modification of the unit of FIG. 5 in which the calibration-resistance strands are transverse to parallel gage filaments.

DETAILED DESCRIPTION OF THE PREFERRED EMBODIMENTS

Having reference to the drawings, wherein like reference characters designate identical or corresponding components and units throughout the several views, and more particularly to FIGS. 1 through 3 thereof, a load-beam type of transducer, 7, is shown in association with a pair of composite gage-and-calibration units, 8 and 9, bonded respectively to flat top and bottom surfaces of its generally-cylindrical beam 10. That beam transducer has basic design features in common with those disclosed in U.S. Pat. No. 2,866,059, where two interconnected transverse circular holes, such as 11 and 12, separate the rigid beam into two parallel beam portions, 7a and 7b, having relatively flexible thinned portions, 7C, 7D, 7E and 7F. One of the rigid ends of the beam, 7g, is secured to a mounting structure 13 by bolts 14, and the opposite rigid end, 7h, is apertured to receive an appropriate means for applying to-be-sensed forces in the downward direction of arrow 15. Under loading, the beam tends to flex at the thinned portions, assuming a characteristic S-shape, and strain gages in the units 8 and 9 sense resulting surface strains in tension and compression at the top and bottom surfaces near those thinned portions. Specifically, a downward force at 7h causes the upper gaged surfaces adjoining thinned flexure portions 7C and 7D to exhibit strains in tension and compression, respectively, while the bottom gaged surfaces adjoining the thinned flexure portions 7E and 7F exhibit strains in compression and tension, respectively. Foil-type electrical-resistance strain gages 8a and 8b (FIG. 2) characterize the tensile and compressive strains adjacent flexures 7C and 7D, for example, and like gages 9a and 9b (FIG. 3) are similarly present in composite unit 9, to characterize the compressive and tensile strains adjacent flexures 7E and 7F. A conventional electrical power source 16 supplies excitation to the full bridge network into which the gages are connected, and an appropriate known form of indicating instrument 17 responds to the bridge output and displays the transducer measurements of loading.

The high-quality steel or other material of which the beam is made will characteristically have a modulus of elasticity (ratio of stress to strain) which varies with temperature, and such variation will lead to related error in measurement output unless it is offset somehow. Further, output changes with temperature have also been the result of related variations in so-called "gage factor" of the strain gages used. Prior practice has commonly involved the insertion of temperature-sensitive resistances in series with the bridge input connections, to modify the bridge excitations automatically by just about the amounts needed to increase or decrease the bridge outputs and restore them to substantially those values which they would have if the modulus changes and gage-factor changes with temperatures did not occur. Just as strain gages have tended to take on standardized resistance values for various purposes, the values of input impedances of the bridge networks into which they are wired have also tended to reflect the usual presence of series-connected temperature-sensitive resistances used to compensate for the modulus and gage-factor changes, and mismatching will occur if those resistances are not utilized in some of inputs of several transducers excited from a common source, for example. Of course, such auxiliary temperature-sensitive resistances represent extra parts, additional mounting and wiring burdens, and other like complications for the manufacture of transducers.

In the latter connection, it has been found possible to offset undesirable effects of modulus changes by way of strain gages which themselves inherently exhibit just the right changes in their gage factor with temperature, and thereby to eliminate those customary temperature-compensation resistances. However, that benefit is attended by the difficulty that the aforesaid mismatching can occur once the need for temperature-compensation resistances is obviated in that way. It is on that account that each of the gage-and-calibration units 8 and 9 includes not only two foil-type strain gages but also, integrally therewith and at a site which will be neutral in respect of strain, a simple unstrained and substantially temperature-insensitive resistor; these are designated as 8c and 9c, respectively, and are on the same insulating carriers 8d and 9d upon which the foil gages and their interconnections and wiring tabs are formed, integrally. The resistors 8c and 9c exhibit total ohmic resistance substantially the same as would be introduced by the prior-art temperature-compensation resistances, and, like the latter, are split to be about equal and to appear separately in each of the two bridge input leads, for purposes of symmetry and balance which can be important with sensitive bridge networks.

As is well known, gage factor of a strain gage represents the amount of resistance change for a given strain, and thus characterizes strain sensitivity. However, despite the implications of that term, there is not necessarily a constant ratio between resistance change and unit strain, and, as has been referred to hereinabove, there can in fact be troublesome changes with temperature. Gage factor changes appear to be related to the materials used to make the gages, and to such matters as the alloys used and heat treatments and cold working involved. When the proper selection is made, taking into account the expected effect upon transducer output of the changes with temperature of the elasticity of the metal from which a transducer is produced, the strain gages will, together, cause their transducer bridge network to have just about the opposite effect upon output over a common range of temperature variations. Typically, the transducer output variations attributable to modulus changes would be substantially linear and of positive slope, so that those attributable to gage factor changes are caused to be of the opposite fixed slope over a temperature range of interest, for the purpose of effecting compensation. Strain gage foil materials which can yield the intended compensatory gage factor changes include nickel-chrome-aluminum alloys such as Karma (73% Ni, 20% Cr, plus Al and Fe; marketed by Driver-Harris Company, Harrison, NJ) and Evanohm (75% ni, 20% Cr, plus al and Cu; marketed by W. B. Driver Co., Newark, NJ). The strain gages and calibration resistors and wiring tabs and connections of each unit 8 and 9 formed from one sheet of the foil found to offer the desired gage factor variations, with a known strain-gage pattern being used for gages 8a, 8b, 9a and 9b, and with conventional printing and acid-etch and like foil-gage manufacturing techniques being used to produce the desired pattern in metal foil atop a suitable insulating carrier (8d, 9d). The calibration resistors 8c and 9c are conveniently patterned with convolutions generally like those of the strain gage filaments, to promote the desired values of resistance, but they are located on the carriers closely astride mid positions between the gages, where they will remain substantially unaffected by strains even though the carriers 8d and 9d on which they are mounted are in turn bonded fully to transducer surfaces. Those mid positions correspond to the locus of a transducer section 20—20 (FIGS. 1 and 2) midway between the sites of flexures 7C–7D and 7E–7F, and the transducer surface strains there are at a minimum and should be of substantially no net value; accordingly, the resistances 8c and 9c are advantageously substantially immune to effects of loading and strain.

The installation represented in FIGS. 3 and 4 may be seen to include the two strain gages of each of units 8 and 9 as adjacent arms of a full bridge network 21 (FIG. 4). Both strain gages of each unit have one end conveniently pre-connected by a relatively large-area and low-resistance integral band or strip of the foil, such as the band 22 of unit 8 as shown in FIG. 5. The integral calibration resistors, 8c and 9c, each have one end pre-connected to the band and also to an enlarged tab, such as tab 23 in FIG. 5, so that the only wiring which must be connected to the units after they are each conveniently installed as a whole is that which connects input to a resistor tab, such as 23, and output and auxiliary balance and compensation elements to the two enlarged strain gage tabs, such as 24 and 25 (FIG. 5), for the gage ends opposite those pre-connected to the calibration resistor for the unit. Those gage ends are shown to be coupled in known fashion to a bridge-balance resistance 27 and temperature-compensation wire 28, internally of the bridge network (FIGS. 4 and 5) and at a mounting location 29 (FIGS. 1 and 3) different from those of the units 8 and 9.

In FIG. 6, a gage-and-calibration resistor unit 8', generally like unit 8, is modified somewhat in that its integral foil calibration resistor 8c' has its resistance strands elongated transversely in relation to the filaments of the gages 8a' and 8b', and thereby offers a further assurance of isolation from the effects of surface strains of the transducer 7, in that the latter are exhibited most strongly in the longitudinal direction parallel with filaments of the strain gages. In specifically-different transducer applications, where the gage and neutral-strain locations are not the same as for the illustrated transducer, the calibration resistor may take up another location and have its strands oriented differently so as to remain immune to strain influences. It may also be advantageous in some instances to use a calibration resistor such as 8c, 9c and 8c' for normalizing the output of a transducer, that is, to insure that the bridge output has a very precise mV/Volt characteristic (such as 2 mV/Volt or 3 mV/Volt) by physical adjustment of it by means of abrasion or the like. In such cases, one may shape the calibration resistor pattern, and locate the resistor, so that there will be optimum access, as installed, for an abrasive tool to be wielded change the resistance, for example. More than one such calibration resistor, and more or less than two strain gages, and other connections and wiring tabs, all may appear integrally on one carrier for their common foil stock, in other advantageous composite units.

Accordingly, it should be understood that the specific embodiments and practices described in connection with this specification have been presented by way of disclosure rather than limitation, and that various modifications, combinations and substitutions may be effected by those skilled in the art without departure either in spirit or scope from this invention in its broader aspects and as set forth in the appended claims.

What I claim as new and desire to secure by Letters Patent of the United States is:

1. A strain-gage transducer bridge gage unit for a transducer having a sensing portion exhibiting surface strains in response to loading thereof, comprising a relatively thin broad-area insulating carrier having a thin metal layer thereon shaped to form both at least a pair of strain gages and a calibration resistor thereon which are integral with one another and with relatively large-area wiring tabs, active portions of said strain gages and said calibration resistor being spaced apart laterally along said carrier to occupy separate positions and to have predetermined orientations promoting response to surface strains and immunity from effects of surface strains, respectively, when said carrier is bonded with predetermined surfaces of a sensing portion of a transducer, said calibration resistor being directly connected integrally at one end with one of said tabs and at its other end with a junction of each of two of said strain gages, whereby said calibration resistor is disposed for electrical wiring externally of a strain gage bridge including said strain gages and calibrates external impedance characteristics of a bridge, said calibration resistor exhibiting resistance which does not vary significantly with temperature over an intended range of use.

2. A strain-gage transducer bridge gage unit as set forth in claim 1 wherein said strain gages are formed on said carrier by two longitudinally-spaced and aligned grids of parallel strain-gage filaments of said layer material, and wherein said carrier has strands of said layer material intermediate said strain-gage grids and forming said calibration resistor with a predetermined resistance value, and wherein said carrier has a relatively low-resistance broad-area band of said layer material integral at its ends with an end of each of said two strain-gage grids and integral at an intermediate position with said one end of said calibration resistor and thereby forming said junction.

3. A strain-gage transducer bridge gage unit as set forth in claim 2 wherein said band of material extends longitudinally between said strain-gage grids, nearer one lateral side thereof, and wherein said calibration resistor extends integrally from said band to one of said tabs located nearer the other lateral side thereof, between two of said tabs each integrally connected with another end of each of said strain-gage grids.

4. A strain-gage transducer bridge gage unit for a transducer having a sensing portion exhibiting surface strains in response to loading thereof, comprising a relatively thin broad-area insulating carrier having a thin metal layer thereon shaped to form both strain gage means and calibration resistor means thereon which are integral with one another and with relatively large-area wiring tabs, active portions of said strain gage means and said calibration resistor means being spaced apart laterally along said carrier to occupy separate positions and to have predetermined orientations promoting response to surface strains and immunity from effects of surface strains, respectively, when said carrier is bonded with predetermined surfaces of a sensing portion of a transducer, said material of said layer imparting to said strain gage means a gage factor changeable with temperature and thereby causes the transducer bridge including the unit with said strain gage means to develop outputs in which tendencies toward changes with temperature due to modulus-of- elasticity variations of the sensing portion of the transducer are substantially offset by tendencies toward changes with temperature due to gage-factor variations of said strain gage means, said calibration resistor means exhibiting resistance which does not vary significantly with temperature over an intended range of use.

5. A strain-gage transducer bridge gage unit as set forth in claim 4 wherein said material of said layer consists of an alloy essentially of nickel, chromium and aluminum, and wherein said calibration resistor means is in circuit with said strain gage means and is of resistance value to adjust imput resistance for the bridge including said strain gage means to substantially a predetermined value.

6. A strain-gage transducer bridge gage unit as set forth in claim 5 wherein said alloy includes about 75% by weight of nickel and about 20% by weight of chromium, and a balance of aluminum together with another material selected from a group including iron and copper.

7. A strain-gage transducer bridge gage unit as set forth in claim 4 wherein said unit is one of two like units for bonding with the sensing portion of a transducer, wherein said layer material is foil, wherein said unit has two laterally-spaced strain-gage grids etched thereon and disposed and oriented to respond respectively to tensile and compressive surface strains on the transducer, wherein said calibration resistor means of said unit is a single resistor etched from said foil and having one end integral with a junction of an end of each of the two strain-gage grids, and wherein the calibration resistors of the two units each serially connects electrical excitation into the transducer bridge by way of one of the junctions and with the two strain gage grids as adjacent arms of the bridge, and wherein said resistors of the two units together bring the total input impedance to the bridge up to substantially a predetermined value.

8. A strain-gage transducer having rigid portions in load-transmitting relationship with an elastically-deformable sensing portion which exhibits surface strains in response to loading thereof, at least one composite gage unit for sensing said surface strains and for introducing calibration resistance into circuit relationship with a strain-gage bridge network, said gage unit including an insulating carrier having a metallic foil layer thereon shaped to form at least one strain-gage grid and at least one calibration resistor thereon which are integral with one another and with relatively large-area wiring tabs, active portions of said grid and resistor being spaced apart laterally along said carrier to occupy separate positions and to have predetermined orientations in relation to said sensing portion which promote response to surface strains and immunity from effects of surface strains, respectively, means connecting said strain-gage grid into a strain-gage bridge network with said calibration resistor in series with the input thereto, said metallic layer being of an alloy essentially of nickel, chromium and aluminum which causes said strain-gage grid to promote changes in outputs from said bridge network which tend to offset changes in outputs due to changes with temperature of the modulus of elasticity of the material of the sensing portion of the transducer, and said resistor exhibiting resistance which augments input impedance of said bridge network and raises it toward a predetermined value.

* * * * *